UNITED STATES PATENT OFFICE.

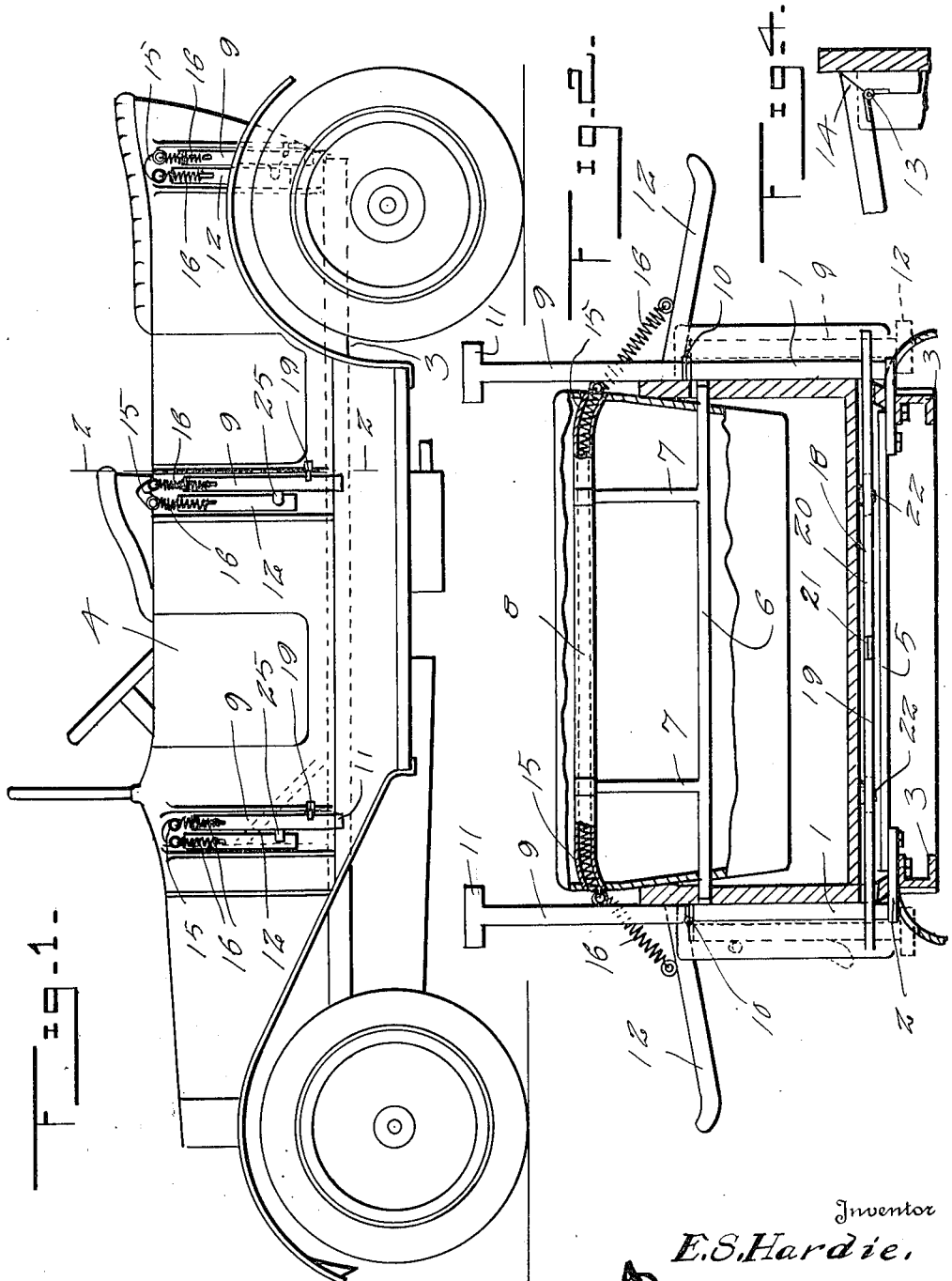

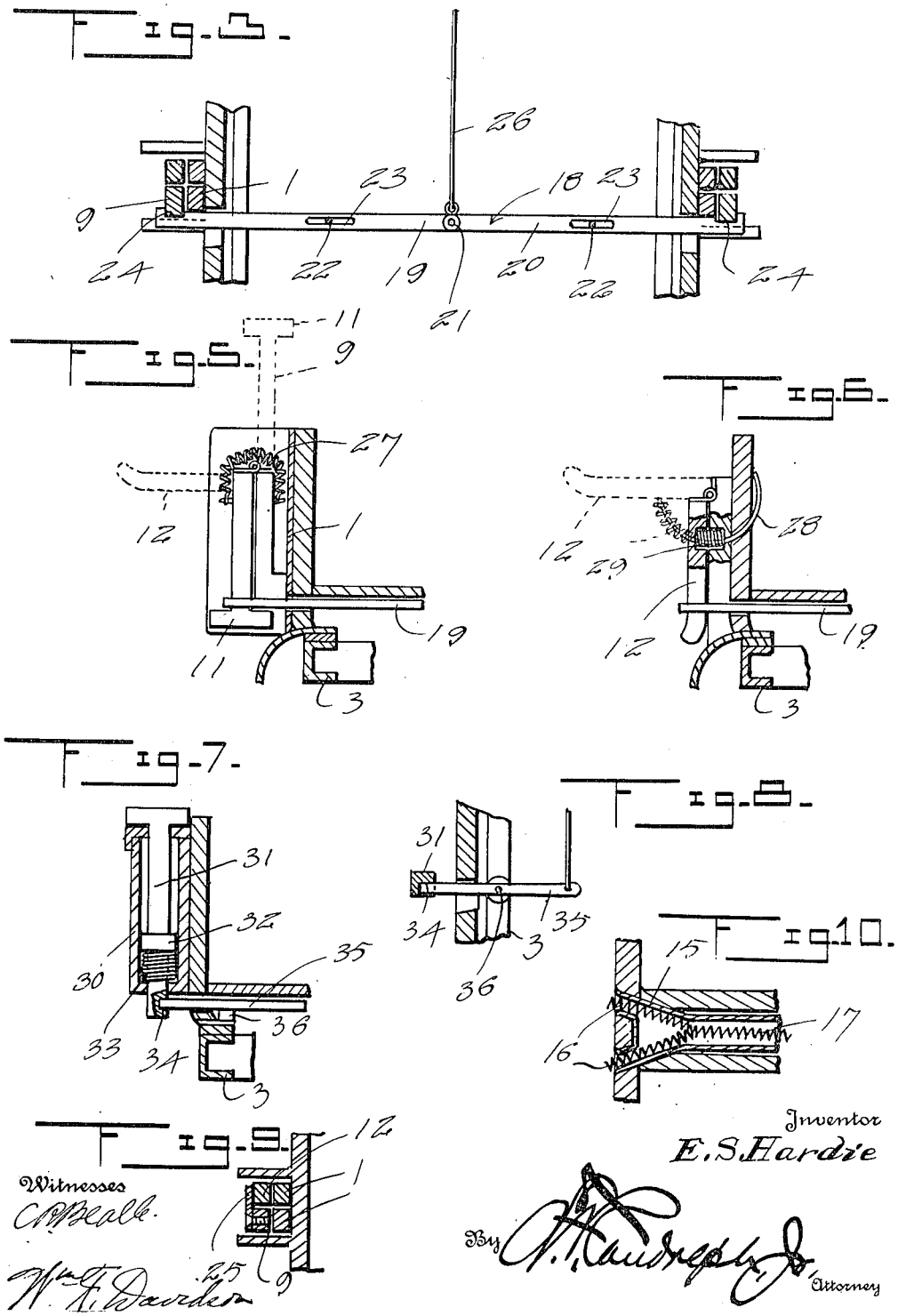

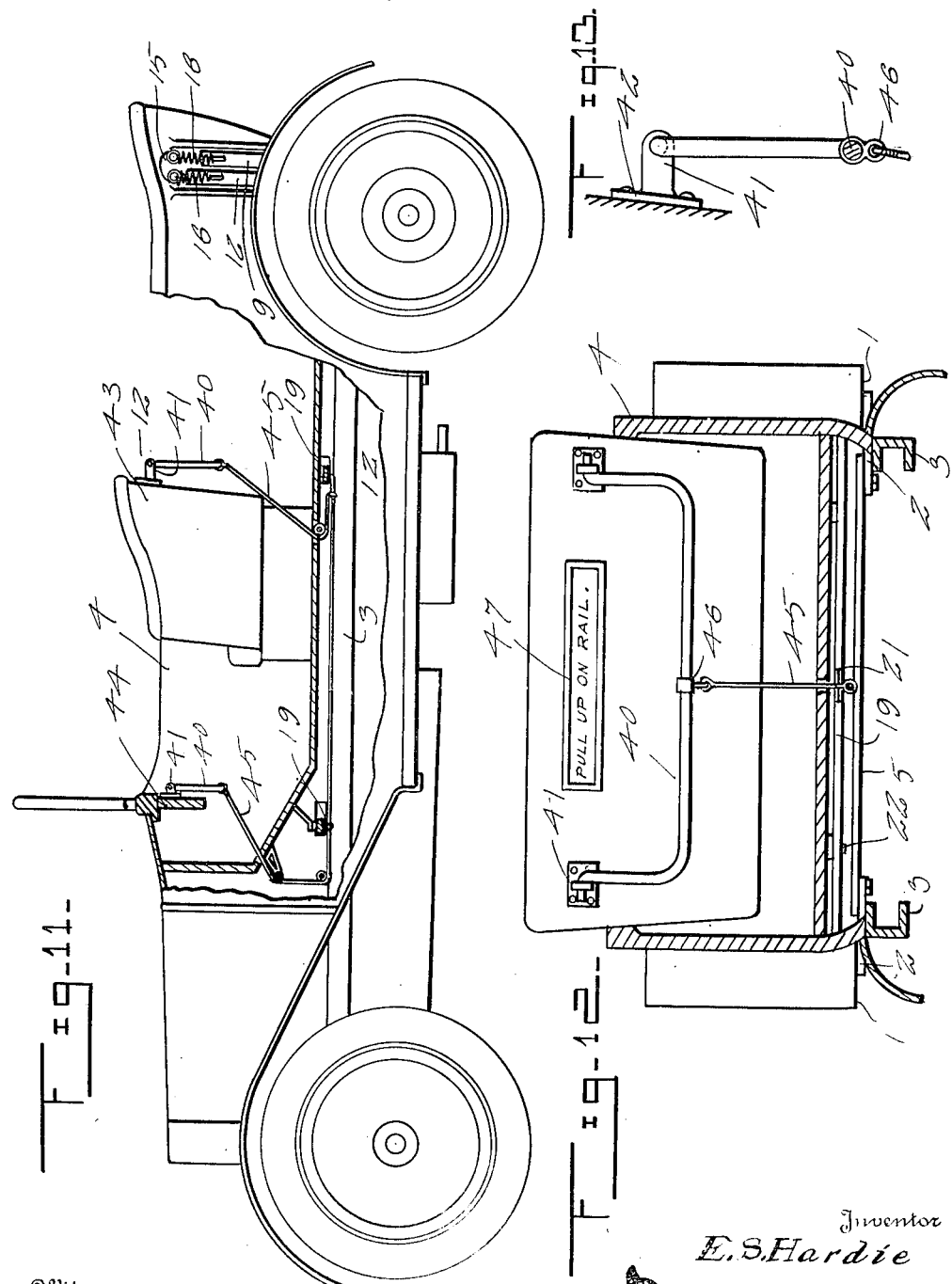

ELGIN S. HARDIE, OF HENSALL, ONTARIO, CANADA.

ACCIDENT-BRAKE.

1,291,496.　　　　　　Specification of Letters Patent.　　Patented Jan. 14, 1919.

Application filed December 22, 1917. Serial No. 208,450.

*To all whom it may concern:*

Be it known that I, ELGIN S. HARDIE, subject of the King of Great Britain, residing at Hensall, in the Province of Ontario and Dominion of Canada, have invented certain new and useful Improvements in Accident-Brakes; and I do hereby declare the following to be a full, clear, and exact description of the invention, such as will enable others skilled in the art to which it appertains to make and use the same.

This invention relates to improvements in accident brakes and more particularly to devices for preventing the occupants of a vehicle or automobile from being crushed or injured when the same turns turtle or turns over on its side.

Another object of this invention is the provision of means adapted to be moved into operative position to support the automobile or vehicle in spaced relation to the ground when it turns turtle to prevent the same from crushing the occupants thereof.

A further object of this invention is the provision of means adapted to be swung laterally of the automobile for the purpose of preventing the automobile or vehicle from turning over upon its side in case of an accident.

A still further object of this invention is the provision of an accident brake of the above stated character, which shall be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings, in which:—

Figure 1 is a side elevation of an automobile illustrating my improved accident brake applied thereto, Fig. 2 is a transverse sectional view illustrating the accident brake in an operative position, Fig. 3 is a fragmentary longitudinal sectional view of a locking means for holding the accident brake in an inoperative position, Fig. 4 is a fragmentary sectional view illustrating means for limiting the upward movement of the horizontal accident brake, Fig. 5 is a fragmentary vertical sectional view of a modified form of my invention illustrating means for moving the accident brake to operative position, Fig. 6 is a fragmentary vertical sectional view of another modified form of invention illustrating means of moving the horizontal brake to an operative position, Fig. 7 is another modified form of my invention of a vertical brake, Fig. 8 is a detail sectional view illustrating a modified form of locking means to be used in connection with my modified form of invention disclosed in Fig. 7, Fig. 9 is a transverse sectional view illustrating means upon the vertical brake to engage and hold the horizontal brake in an inoperative position, Fig. 10 is a fragmentary sectional view of means for supporting the brake to an automobile body.

Fig. 11 is a longitudinal sectional view of an automobile illustrating a modified means for releasing the accident brakes, Fig. 12 is a transverse sectional view of the same, Fig. 13 is a detail sectional view of an operating handle.

Referring in detail to the drawings, the numeral 1 indicates channel iron supporting means having formed upon their lower ends attaching feet 2 which are secured to the chassis 3 of the automobile 4. The members 1 are arranged in oppositely disposed pairs upon the sides of the automobile 4 and have their respective feet connected by bars or rods 5 and their upper ends connected by bars 6 which extend through the body of the car and preferably the backs of the seats thereof. The bars 6 have vertically extending supporting arms 7 formed thereon which support spring supporting casings 8 that extend through the body of the car and preferably the backs of the seats thereof as clearly illustrated in Fig. 2. Vertical brakes 9 are hinged to the upper end of one of the supporting members of each of the pairs as illustrated at 10 and have formed upon their free ends heads 11. Horizontal brakes 12 are hinged as illustrated at 13 to the upper end of the other vertical supporting member of each of the pairs and have their hinged ends beveled as illustrated at 14 for coöperation with the beveled upper ends of the supporting members so as to limit the movement of the horizontal brakes into operative position. Each end of the tubes 8 is provided with branches 15 to receive coil springs 16 which are connected to the vertical and horizontal brakes 9 and 12 respectively as illustrated in Fig. 2 and have their other ends connected to springs 17 that extend through the tubes 8. The brakes will be swung in an operative position as soon as they are released by means which will be hereinafter more fully described.

Catches 18, each consisting of a pair of members 19 and 20 are hinged together as illustrated at 21 and pivotally mounted on the bottom of the automobile 4 by means of pins 22 passing through slots 23. The sections 19 and 20 have their outer ends disposed through the sides of the automobile and notched as illustrated at 24 to engage the vertical brakes 9 to hold them in an inoperative position.

The vertical brakes 9 have secured thereon extensions 25 that overlie the horizontal brakes 12 and hold them in an inoperative position when the catches 18 are in engagement with the vertical brakes. The catches 18 and 19 have connected thereto cables 26 which may be in turn connected to a suitable foot pedal located in convenient reach of the operator of the automobile so that upon pressing the same the catches will be disengaged from the vertical brakes which will immediately swing to an operative position under the influence of the springs, permitting the horizontal brakes also to swing to an operative position. When the brakes are in an operative position, they will support the automobile in spaced relation from the ground when it has turned turtle preventing the same from injuring or crushing the occupants thereof. The horizontal brakes being disposed laterally of the automobile will have a tendency to prevent the automobile from turning turtle if in an accident as they would engage the ground and support the same in an inclined plane from whence the automobile may return to an upright position or upon its wheels of its own accord.

Referring to my modified form of invention as illustrated in Fig. 5, the springs 27 are connected to the supporting members 1 and to the vertical and horizontal brakes as clearly illustrated in Fig. 5 so that when the brakes are released from an inoperative position they will be swung automatically to an operative position under the influence of the springs.

Referring to my modified form of invention as shown in Fig. 6, the horizontal brakes have secured thereto arcuate shaped members 28 which pass through the supporting members 1 and the sides of the automobile and have mounted thereon springs 29 which bear against the supporting members and the horizontal brakes, which will automatically move said horizontal brakes to an operative position when released from an inoperative position.

Referring to my modified form of invention as disclosed in Fig. 7, it consists of casings 30 secured to the sides of the automobile in which is slidably mounted the vertical brakes 31. The vertical brakes 31 have formed thereon shoulders 32 which have one end of coil springs 33 disposed thereagainst while the opposite ends of the coil springs are disposed against the lower ends of the casings 30 for urging the vertical brakes outwardly or upwardly from the casings. The lower ends of the vertical brakes 31 are provided with notches 34 to receive locking members 35 which are pivoted to the automobile as illustrated at 36 and have connected thereto the cables for actuating the same.

Referring to my modified form of invention as illustrated in Figs. 11 to 13 inclusive it discloses the means for releasing the vertical and horizontal accident brakes and consists of a substantially U-shaped handle 40 pivoted to ears 41 formed upon attaching brackets 42. The attaching brackets 42 are secured to the rear face of the front seat 43 of the automobile and also to the dash 44 of the automobile so that the handles 40 will be in convenient reach of the occupants of the automobile where any one of them may readily manipulate the same.

The cable 26 has connected thereto a pair of branch cables 45 that extend over pulleys carried by the automobile and are secured to the handles 40 as illustrated at 46 whereby upon swinging any one of the handles 40 to a substantially horizontal position, the catch 18 will be actuated to release the accident brakes. It will also be noted that the handles 40 when in normal position or depending downwardly may be used for supporting robes or the like within the automobile and it will also be noted that in case of an accident the occupants of the car will be provided with suitable means to catch hold of to prevent from being thrown from the automobile.

A suitable frame 47 is secured to the automobile for supporting instructions as to how to operate the handles 40 in case of an accident.

From the foregoing description taken in connection with the accompanying drawings, it will be noted that means has been provided which can be easily and conveniently actuated in case of an accident to prevent the automobile from crushing or injuring its occupants if it turns turtle or turns upon its side.

While I have shown and described the preferred embodiment of my invention, it will be understood that minor changes in construction, combination and arrangement of parts may be made without departing from the spirit and scope of the invention as claimed.

Having thus described my invention, what I claim is:

1. An accident brake comprising a plurality of supporting members secured to the sides of an automobile, vertical and horizontal brakes hinged to said supporting members, and means moving said brakes into an operative position.

2. A device of the character set forth comprising supporting members secured to an automobile, horizontal and vertical brakes hinged to said supporting members, means locking said brakes in an inoperative position, and tension means connected to the brakes for swinging them into an operative position when released from an inoperative position.

3. A device of the character set forth comprising supporting members secured to the sides of an automobile, horizontal and vertical brakes hinged to said members, springs connected to said brakes for swinging them in an operative position, and means locking said brakes in an inoperative position against the tension of the springs.

4. The combination with an automobile including a body and a chassis therefor, supporting members disposed upon each side of the body and arranged in pairs, attaching feet formed on said supporting members and secured to the chassis, bars connecting the feet, horizontal vertical brakes hinged to said supporting members, springs urging said brakes to an operative position, and means locking said brakes in an inoperative position.

5. The combination with an automobile including a chassis having a body thereon, of supporting members arranged in pairs upon each side of the automobile, means securing said members to the chassis, bars connecting said members, arms formed on said bars, tubes carried by said arms and having branches, springs extending through said tubes, springs connected to the first named springs and extending through the branches, horizontal and vertical brakes hinged to said members and connected to the second named springs, and means locking the brakes in an inoperative position.

6. A device of the character set forth comprising supporting members, horizontal and vertical brakes hinged to said members, tension means for urging said brakes into an operative position, catches engaging the vertical brakes to hold them in an inoperative position, and means upon the vertical brakes to engage the horizontal brakes to hold them in an inoperative position.

7. The combination with an automobile including a body, supporting members secured to said body, horizontal and vertical brakes hinged to said members, tension means connected to said brakes for swinging them into an operative position, members pivotally and slidably connected to the automobile, means hinging said members together, said members having their free ends notched to engage the vertical brakes, means disengaging said members from the vertical brakes, and means upon the vertical brakes to engage the horizontal brakes to hold them in an inoperative position when engaged by the catches.

8. A device of the character set forth comprising supporting members, vertical and horizontal brakes secured to said supporting members, springs connected to the brakes and to the supporting members for swinging said brakes into an operative position, and means locking said brakes in an inoperative position.

9. A device of the character set forth comprising supporting members, horizontal brakes secured to said supporting means, arcuate shaped rods pivoted to said brakes and extending through the supporting members, and springs mounted upon said arcuate shaped members for forcing the brakes into an operative position.

10. An accident brake comprising a plurality of supporting members secured to the sides of an automobile, vertical and horizontal brakes hinged to said supporting members, means moving said brakes into operative position, means holding said brakes in an inoperative position, a cable connected to said means, a substantially U-shaped handle connected to the cable and pivoted to the automobile for actuating said means to permit the brakes to move into operative position.

In testimony whereof I affix my signature in presence of two witnesses.

ELGIN S. HARDIE.

Witnesses:
C. A. McDonell,
Maude Porter.